Figure 4:
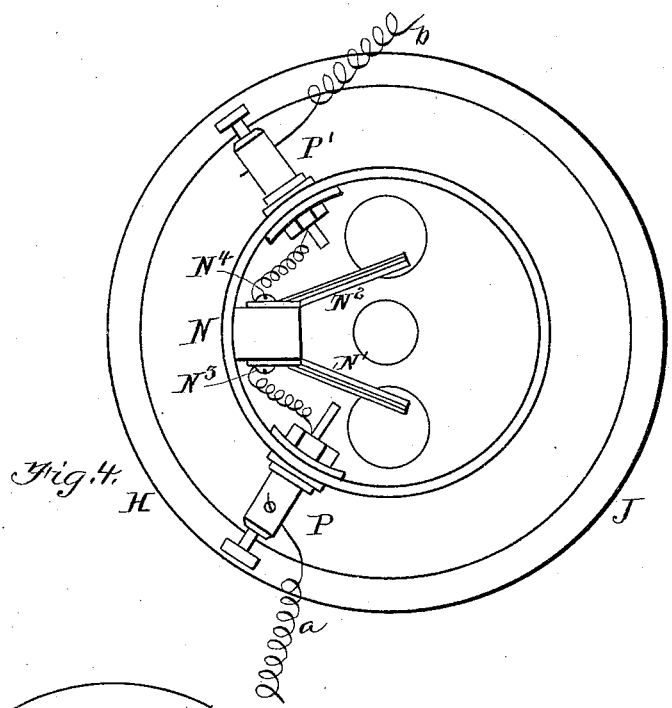

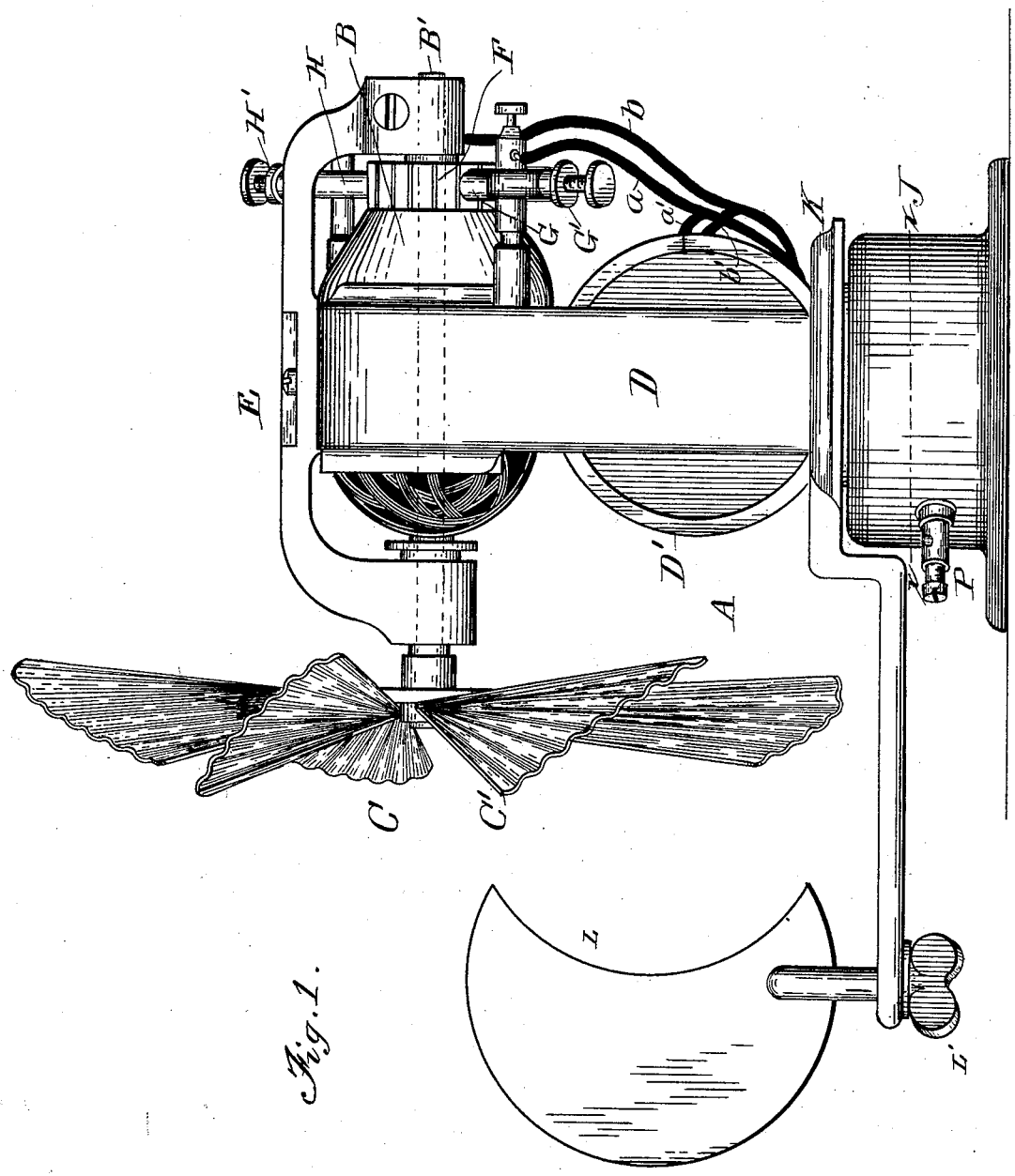

(No Model.)  2 Sheets—Sheet 2

W. S. HILL.
FAN MOTOR.

No. 508,710.  Patented Nov. 14, 1893.

Witnesses:
E. L. Harlow
L. H. Trow

Inventor:
Warren S. Hill
By J. S. Rusk
Attorney

UNITED STATES PATENT OFFICE.

WARREN S. HILL, OF HYDE PARK, MASSACHUSETTS.

FAN-MOTOR.

SPECIFICATION forming part of Letters Patent No. 508,710, dated November 14, 1893.

Application filed June 7, 1893. Serial No. 476,897. (No model.)

*To all whom it may concern:*

Be it known that I, WARREN S. HILL, of Hyde Park, county of Norfolk, Commonwealth of Massachusetts, have invented certain new and useful Improvements in Fan-Motors, of which the following is a full, clear, and exact description, which will enable others skilled in the art to which the invention appertains to use the same.

My invention has for its objects: first, to provide a rotary fan motor by which the air is distributed in all directions around the room; second, to provide a rotary fan motor in which the center of the armature is in line with the center of gravity of the motor; third, to provide means by which the fan motor is revolved by the pressure received from the rotation of the fan; fourth, to regulate the velocity of rotation of said fan motor. These and other objects of my invention are accomplished by mechanism hereinafter described and shown in the drawings and particularly pointed out in the claims.

My invention consists of certain novel features, arrangements and constructions hereinafter described and claimed, and shown in the drawings accompanying this specification.

Figure 3:
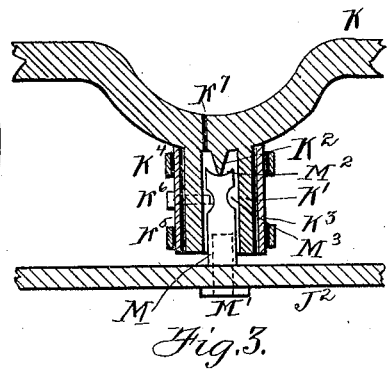
Figure 2:
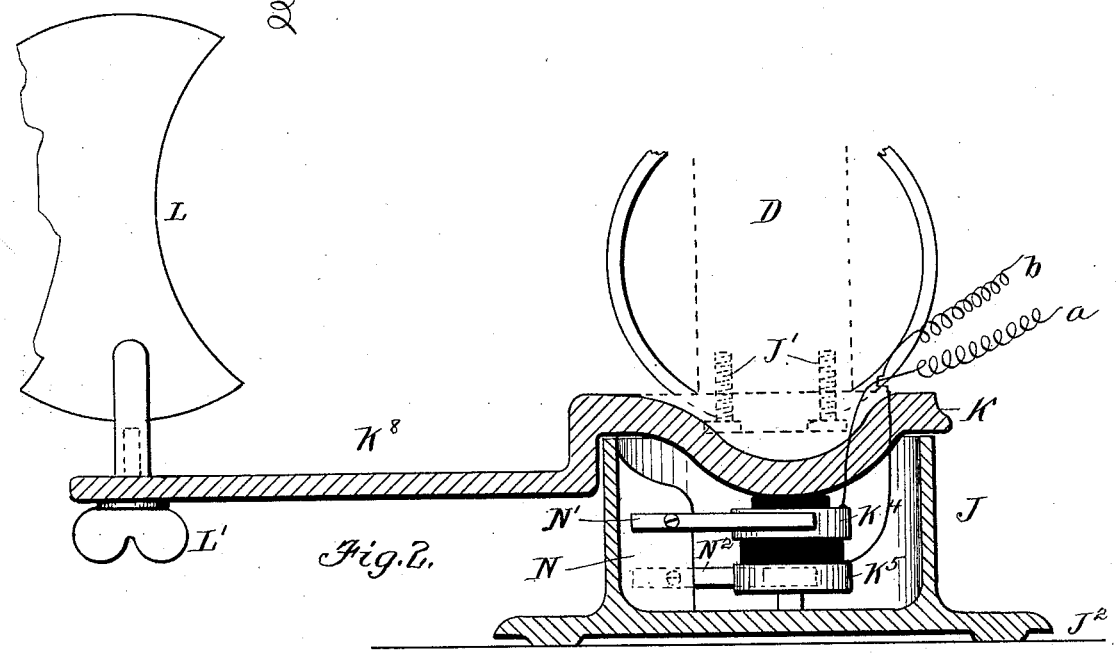

In the drawings which accompany this specification Figure 1 represents a side elevation of the rotary fan motor. Fig. 2 is a vertical transverse section through the base of the motor. Fig. 3 is a detailed view in section of the pivot and the bearing pin supporting the motor and co-operating parts. Fig. 4 is a plan view taken on the line $x\ x$ of Fig. 1.

Like letters of reference refer to like parts throughout the several views.

A represents a fan motor of the Siemens shunt wound type having an armature B, on the axis B′ of which the fan C is mounted.

D represents the field magnet, D′ the field magnetic coil and E is the non-magnetic top which supports the armature.

F represents the commutator with which the brushes G and H, secured to the binding screws G′ H′, are in contact.

Above the base J and sufficiently elevated so as not to be in contact therewith is a dish-shaped pivoted base plate K hollowed out, as shown, to make room for the magnetic coil D′, and is secured by screws J′ to the motor proper. Projecting from the under side of said plate is a hub K′ which has been bored out, and at the upper end of said hub is a steel pin K² driven into the bottom of said plate K. Around the hub K′ is a layer of rubber K³, and around the insulating rubber are two insulated rings K⁴ K⁵ which are driven thereon. A bearing pin M is secured to the base plate J² of the base J by a screw M′, and over said bearing pin the hub K′ is placed, as shown, with the steel point K² resting in the hollowed out end M² and acting as a pivot on which the entire motor turns during its revolutions. The bearing pin M is made of sufficient length to prevent the tipping over of the motor during its revolutions. In contact with the insulated metallic rings K⁴ K⁵ are two brushes N′ N² secured to an insulated block N by the screws N³ N⁴. The pivot K² and the bearing pin M are suitably lubricated by oil passing through the oil passage K⁷. To prevent the motor being lifted from the base J the bearing pin M is hollowed out at M³, and a set screw passes through the rubber and hub K′ to the hollowed space N³, but not in contact therewith, so that the motor cannot be lifted from the base plate without removing the set screw K⁶. From the dish shaped plate K an arm K⁸ extends, and at the end of said arm a crescent shaped rudder L is secured by an adjustable set screw L′. The current is received from any suitable source of supply and passes in by the wire $a$ to the binding post P, secured to the base J, through the brush N′ to the ring K⁴ and thence to the field magnet and armature and by the wire $b$ passes out again through the ring K⁵ and brush N² to binding post P′, and thence to source of supply; the wires $a'\ b'$ connect the field magnet D′ with the current. The center of gravity being directly on the pivot, and the center of the armature being in line with the center of gravity, the element of friction is materially reduced. When a current of electricity has passed through the motor, the fan C revolves and currents of air are driven through the blades of the fan and strike the rudder L, which is directly in line with the axis of the armature to which the fan is secured and is set at any desired angle to the axis of said fan so as to receive pressure on one of its sides, which causes the motor to turn on its pivot and a continuous rotary motion is given to the whole motor, thereby throwing the wind from the fan in all directions as it revolves. The degree of velocity of rotation of the motor is regulated by the position of the rudder L to the fan C, that is,—the variation of velocity is regulated by setting the rudder at different degrees to the fan. When it is not desired to rotate the fan the rudder is set directly in line with the fan C and thereby offers no resistance to the wind from said fan, and the motor consequently does not revolve. It is obvious that the air delivered from the fan is in a rotary direction, and that if the rudder L be made of sufficient height to equal the diameter of the fan, so as to receive the air from the blades both above and below its center, the motor can be made to revolve in either direction by changing the pitch of the rudder to either side of the center; with a rudder of only half the height, as shown in the drawings, it is only practical to cause the motor to revolve in one direction.

The blades C' of the fan may be fluted in lines radiating from its center, as shown, which not only assists the blades in catching the air during revolution, but materially strengthens them and prevents their flattening out when revolving, by which flattening the blades merely slide through the air and do not throw out currents of air from said fan.

I do not limit myself to the arrangements and constructions shown and described, as the same may be varied without departing from the spirit of my invention.

Having thus ascertained the nature and set forth the construction of my invention, what I claim as new, and desire to secure by Letters Patent of the United States, is—

1. A fan motor pivotally mounted and provided with means operated by the air pressure received from the fan for rotating the same, substantially as set forth.

2. A fan motor pivotally mounted and having the center of its armature in line with its center of gravity, means operated by the air pressure received from the fan for rotating the same, and means for varying the velocity of rotation, substantially as set forth.

3. A fan motor pivotally mounted and having the center of its armature in line with its center of gravity, and means operated by the pressure received from the fan in revolving for rotating the same, substantially as set forth.

4. A fan motor having a pivotal base plate, a base to receive the pivot of said plate, an arm extending from said base plate in line with the armature of the motor, a rudder secured to said arm and adapted to receive pressure from the fan in revolving and thereby rotate the motor, substantially as set forth.

5. A fan motor pivotally mounted and having an arm extending therefrom in line with its armature, a rudder secured to said arm and adjusted to different angles to the fan and adapted to receive pressure from the fan in revolving and thereby rotate the motor, the velocity of rotation of said motor being regulated by the angle of inclination of the rudder to the fan, substantially as set forth.

6. In a fan motor, a base having a bearing pin for supporting the said motor, a pivotal base plate having a pivot which rests on said bearing pin, an arm extending from said base plate in line with the armature of the motor, a rudder secured to said arm and adapted to receive the pressure from the fan in revolving and thereby rotate the motor, substantially as set forth.

7. In a fan motor, a base having a bearing pin for supporting the said motor, a pivotal base plate having a pivot which rests on said bearing pin, a hub secured to said base plate and arranged around said bearing pin, rings around said hub insulated therefrom, and brushes in contact with said rings and insulated from the base, and suitable wires for receiving and returning the current, substantially as set forth.

8. A fan motor pivotally mounted and provided with means operated by the air pressure received from the fan for rotating the motor, and means for varying the velocity of rotation, substantially as set forth.

In testimony whereof I have signed my name to this specification, in the presence of two subscribing witnesses, on this 8th day of May, 1893.

WARREN S. HILL.

Witnesses:
E. L. HARLON,
LILLIAN H. TROW.